United States Patent
Burkhart

[15] 3,679,062
[45] July 25, 1972

[54] FILTER LEAF AND METHOD OF MAKING THE SAME

[72] Inventor: Clark B. Burkhart, Livonia, Mich.

[73] Assignee: AMBAC Industries, Incorporated, Garden City, N.Y.

[22] Filed: Dec. 17, 1969

[21] Appl. No.: 885,833

[52] U.S. Cl.............................210/486, 210/490, 210/499, 210/500
[51] Int. Cl......................................................B01d 39/12
[58] Field of Search..................210/486, 487, 489, 496, 498, 210/499, 490

[56] References Cited

UNITED STATES PATENTS

| | | | |
|---|---|---|---|
| 2,249,063 | 7/1941 | Swem | 210/486 |
| 3,327,866 | 6/1967 | Pall et al. | 210/499 |
| 1,381,944 | 6/1921 | Sweetland | 210/486 X |
| 2,263,853 | 11/1941 | Re Qua | 210/486 |
| 2,705,221 | 3/1955 | Clark et al. | 210/486 X |
| 3,486,627 | 12/1969 | Ashby | 210/486 |

FOREIGN PATENTS OR APPLICATIONS

| | | | |
|---|---|---|---|
| 73,660 | 9/1916 | Austria | 210/486 |

*Primary Examiner*—John Adee
*Attorney*—Harness, Dickey & Pierce

[57] ABSTRACT

A filter leaf having a pair of spaced sheets disposed on opposite sides of a porous metallic spacer. At least one of such sheets consists of filter cloth through which a liquid flows to the spacer and thence to a peripheral or central outlet in the leaf. The spacer is desirably made from coarse woven wire cloth or expanded metal and is sprayed with a brazing material on one side thereof. The spacer and sheets are positioned together in a brazing furnace with a metallic sealing ring surrounding the spacer. Brazing material flows to the areas of contact between the sheets and the spacer, to establish a number of metallurgically bonded connections between the sheets and the areas of contact between the sheets and the spacer, to establish a number of metallurgically bonded connections between the sheets and the spacer and prevent movement of the sheets relative to the spacer.

12 Claims, 5 Drawing Figures

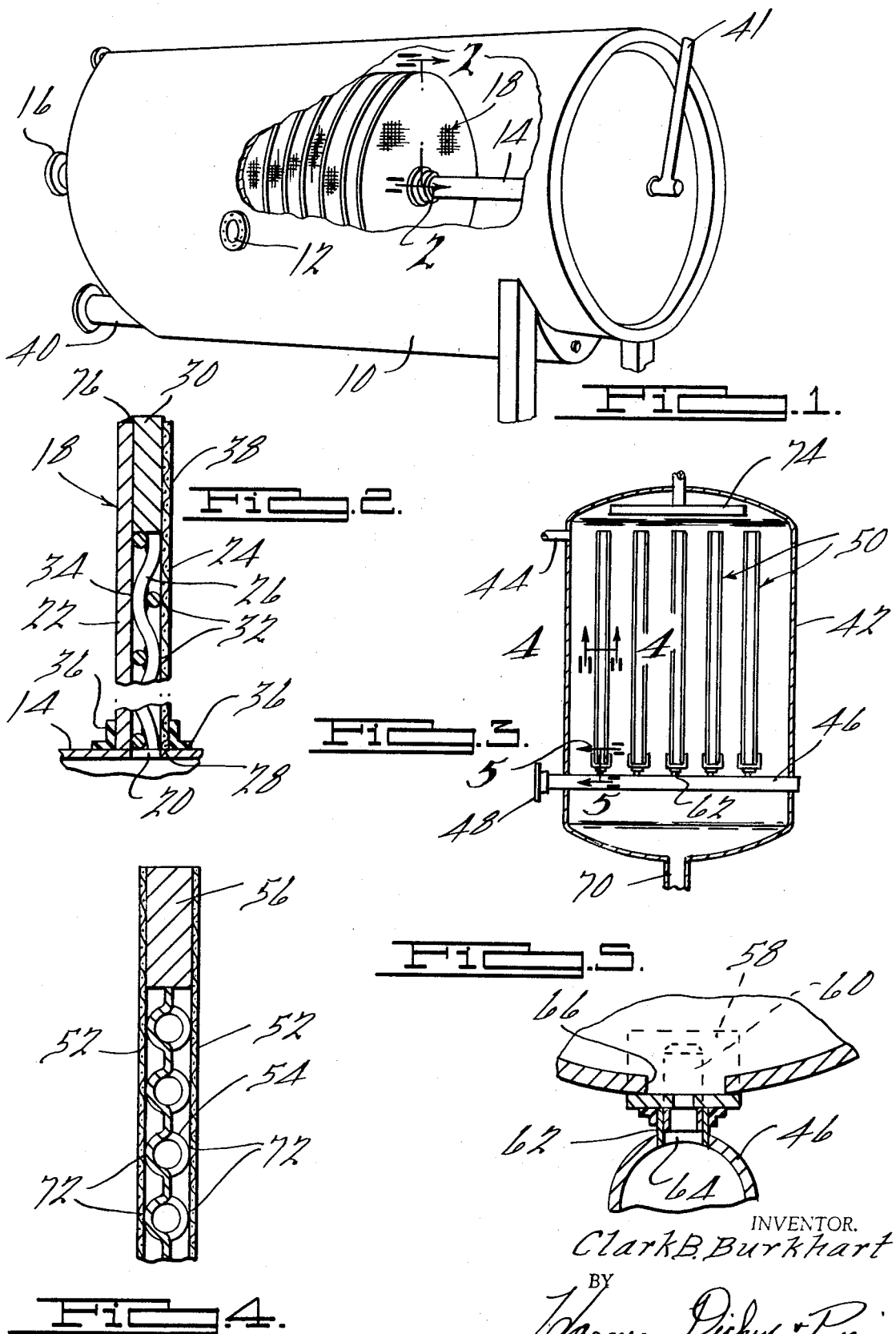

FILTER LEAF AND METHOD OF MAKING THE SAME

SUMMARY OF THE INVENTION

In conventional filter leaf construction a pair of filter sheets are held on opposite sides of a spacer by means of a U-shaped binder or the like at the outer periphery of the leaf. A number of such filter leaves are fitted to a collecting pipe within a tank. Fluid flows through the sheets from the outer sides thereof to the spacer. The spacer is porous and provides a drainage path for the flow of filtered fluid to the collecting pipe. Diatomaceous earth or other loose filtering material may be applied to the outer surfaces of the sheets.

A serious problem exists in the maintenance of filter leaves and particularly the periodic cleaning of the leaves. One of the most desirable methods of cleaning filter leaves is by "back washing" them. This refers to the reverse flow of fluid from the collecting pipe to the spacer and thence outwardly through the filtering sheets. This process, however, applies a force to the filter cloth or sheets tending to displace them away from the spacer. Because the filtering sheets have been secured to the spacer only at their outer periphery, the back washing operation has had a tendency to impart a permanent outward distortion to the filter sheets and has caused premature destruction of the product.

Another method of cleaning filter leaves involves the use of a scraper blade to wipe the filter sheets. In prior constructions, however, peripheral binders have protruded outwardly of the planes of the filter sheets and have interfered with the use of wiper blades. Such a non-planar outer surface configuration of the filter leaves also impedes the spray cleaning of the filter leaves or the removal of sludge by rotating the leaves.

The filter leaf of the present invention is intended to overcome the foregoing problems and to provide a filter leaf which is durable in construction, supported against outward distortion, readily cleaned, reliable in the use and susceptible of manufacture at a reasonable cost. This filter leaf construction is characterized by the use of a diffusion bonding to achieve a large number of metallurgical bonds between the spacer and the filter cloth at the contact points therebetween.

DESCRIPTION OF THE VIEWS OF THE DRAWINGS

FIG. 1 is a perspective view with parts broken away of a filter mechanism employing filter leaves constructed according to the present invention;

FIG. 2 is a broken sectional view of the structure illustrated in FIG. 1 taken along the line 2—2 thereof;

FIG. 3 is a sectional view of another filter mechanism employing a modified form of filter leaf made according to the present invention; and FIGS. 4 and 5 are sectional views of the structure illustrated in FIG. 3 taken along the lines 4—4 and 5—5 thereof respectively.

DESCRIPTION OF THE ILLUSTRATED EMBODIMENTS OF THE INVENTION

FIG. 1 shows a filter tank 10 in the form of a hollow cylinder oriented with its axes in a horizontal plane. The tank 10 has an inlet 12, a central, axially extending collecting pipe 14 and an outlet 16 at one end of the pipe 14. A plurality of filter leaves 18 are positioned in axially spaced relationship along the pipe 14 and each leaf 18 registers with a separate opening 20 in the pipe.

The construction of each filter leaf will be seen in FIG. 2. The filter leaf 18 includes a non-porous sheet 22, a sheet 24 made from fine woven wire cloth and a spacer 26 made from coarse woven wire cloth. Sheet 22 is made from sheet steel or other metal. The filter leaf 18 is of a generally disk-shaped or circular configuration, with a central opening 28 of a size permitting the filter leaf to be fitted snugly but slidably over the pipe 14.

The space between the sheets 22 and 24 is sealed at the outer periphery of the filter leaf by means of an annular sealing ring 30. The sealing ring flatly contacts the sheets 22 and 24 on its opposite sides and is joined to the sheets 22 and 24 by brazing material as well as by tack welding. The spacer 26 is joined to the sheet 24 by brazing material at joints 32 formed where the sheet 24 contacts the spacer. Similarly, the spacer 26 is brazed to the sheet 22 at joints 34 formed at each of the areas of contact between the sheet 22 and the spacer.

From the foregoing it will be seen that fluid is free to flow through the sheet 24 from the outer surface 38 thereof into the spaces provided between the individual wires of the spacer 26. From this location the filtered fluid flows radially inwardly to the opening 20 with which the particular filter leaf registers. Gaskets 36 are provided on opposite sides of the filter leaf to prevent leakage of unfiltered fluid directly into the openings 20.

It will be seen that the tank 10 can be drained through a drain outlet 40. The cleaning of the individual filter leaves is aided by rotating the pipe 14 by means of a crank arm 41 at one end thereof. The filter leaf 18 may be used either as illustrated in the drawings or by applying a coating of diatomaceous earth or other particulate filtering material to the outer surface 38 of the filter sheet 24.

The geometric shape of each filter leaf 18 as seen in plan view is not critical to the present invention. While the filter leaves 18 are of circular configuration as seen in plan view, they may also be square shaped or possess a variety of other configurations. It will also be seen that the filter leaf 18 has an outlet at its center. It is within the contemplation of the present invention to provide a filter leaf having an outlet at its outer periphery. Such a filter leaf is illustrated in FIGS. 3 to 5. The method of manufacturing the filter leaf 18 as well as the filter leaf illustrated in FIGS. 3 to 5 will be explained after the description of the filter leaves shown in FIGS. 3 to 5.

FIG. 3 discloses a filter tank 42 having an inlet 44 and a collecting pipe 46. An outlet fitting 48 is provided at one end of the collecting pipe 46. A plurality of identical filter leaves 50 are positioned in spaced locations along the collecting pipe 46. Each of the leaves 50 includes a pair of spaced woven wire cloth filter sheets 52 disposed on opposite sides of a spacer 54. The spacer 54 is made from expanded metal and is surrounded by a metallic sealing ring 56. An outlet fitting 58 is secured to the outer periphery of the filter leaf 50 and is provided with a hollow nipple 60 received within an upstanding sleeve 62 on the collecting pipe 46. Each sleeve 62 registers with an opening 64 in the pipe 46 while the nipple 60 is in communication with the spacer 54 through a gap or interruption 66 in the ring 56. A gasket 68 aids in sealing the joint between the nipple 60 and the sleeve 62.

The sheets 52 are brazed to the spacer 54 at joints 72 formed at all areas of contact between said sheets and the spacer. It will, of course, be apparent that the spacer 54 is porous in nature and provides a path for the flow of fluid from the space between the sheets 52 to the nipple 60. Cleaning of the filter leaf 50 is aided by a spray head 74 operable to direct jets of cleaning fluid generally tangentially along the outer surfaces of the sheets 52. The tank 42 may be drained through a drain 70.

Manufacture of the filter leaves 50 is substantially the same as the manufacture of the filter leaves 18. However, the process will be described with respect to the filter leaves 18. Preferably, a light coating of nickel brazing material (not shown) is applied to one side of the spacer 34. The brazing material is in a fine powdered form and is sprayed by means of conventional electrostatic spraying techniques. Next, the ring 30 is tack welded to the sheet 22 in the position illustrated in FIG. 2. The exposed surface of the ring 30 is also spray coated with brazing material. The spacer 26 is then held on the sheet 22 within the ring 30 and with the spray coated side of the spacer in contact with the sheet 22. The sheet 24 is then laid over the spacer 26 and ring 30 and is tack welded to the ring 30. The tack welding of the ring 30 to the sheets 22 and 24 leaves weldments (not shown) at circumferentially spaced locations around the filter leaf. Such weldments serve only to position the parts properly during the subsequent brazing operation. The assembly is then positioned in a brazing furnace with the sheets 22 and 24 arranged in a horizontal attitude and held against the spacer 26 by ceramic plates (not shown). A stack of filter leaves 18 may be positioned within the furnace with a separate ceramic plate between each filter leaf. The weight of the filter leaves 18 and ceramic plates applies pressure to the opposite sides of each filter leaf to establish the desired contact between the sheets 22 and 24 and the spacer 26. The stack of filter leaves 18 is then subjected to a brazing temperature for a suitable length of time during which the brazing material will flow by "wicking" to all of the joints where the wires of the spacer 26 overlap and to the areas of contact 32 and 34 between the spacer 26 and the sheets 22 and 24. Extra brazing material is also laid at the outer periphery of the ring 30 as indicated at 76 to assure a good brazed joint between the ring 30 and the sheet 22. Of course, the sheet 24 is brazed to the ring 30.

The manufacture of the filter leaf 50 is essentially the same as that described for the filter leaf 18. It is only necessary to add extra brazing material at the joints between the fitting 58 and the sheets 52 to insure a proper seal therebetween. As in the first embodiment, only one side of the spacer 54 is spray coated with brazing material. In this case, however, 10 to 20 percent of the pores of the sheet 52 in contact with the sprayed side of the spacer 54 are plugged with brazing material. The pores of the other sheet 52 are left virtually unplugged by brazing material except at the joints 72. A sufficient number of the pores of the screen 52 in contact with the sprayed side of the spacer remain unplugged to render the use of two porous sheets desirable for many applications. It is to be emphasized, however, that the magnitude of brazing material applied to the spacer 26 or 54 should be very slight to avoid undesirable plugging of the pores of the screen 24 or the screens 52. With a little experimentation, the optimum amount of brazing material can be determined. In various tested forms of the invention illustrated in FIGS. 1 to 3, the spacer 26 was made from different sized woven wire cloth. In some cases the spacer had four wires to the inch with the wires possessing a diameter of 0.063 inch. In other cases the spacer had only one wire to the inch and this wire was 0.120 inch in diameter. While spacers of this size range work satisfactorily, it is believed that various other sized spacers would also perform well. Likewise a variety of fine woven wire cloth materials may be used for the sheets 24 and 52, 24×110 Dutch weave and 60×50 twill weave materials having been found to operate satisfactorily. A variety of metal alloys might be used for the spacer and filter cloth although stainless steel was found to be entirely suitable.

The joints 32, 34 and 72 have been described as brazed joints. While brazing is the preferred technique of achieving the desired joints between the spacer and the filter cloths, the invention in its broadest scope contemplates any metallurgical bond at such joints. The methods for achieving such a bond may be said to fall under the general heading of "diffusion bonding," brazing and sintering being the most common forms of diffusion bonding. It should be mentioned, however, that experiments to date indicate that brazing is lest costly than sintering and produces a superior bond.

What is claimed is:

1. A filter leaf consisting essentially of a pair of spaced parallel flat metallic sheets at least one of which comprises a fine woven wire cloth, a unitary porous metallic spacer disposed between said sheets and in engagement therewith at a large number of spaced locations distributed over substantially the entire areas thereof, and a sealing ring surrounding said spacer in the space between said sheets and sealing the space between said sheets at the outer peripheries thereof, said at least one porous sheet being diffusion bonded to said spacer at substantially all of the contact locations therebetween whereby said sheets and spacer are united into a single rigid structure in which movement of any portion of said sheets away from said spacer is prevented.

2. The structure as set forth in claim 1 in which said at least one sheet is brazed to said spacer at substantially all of the contact locations therebetween and is brazed to said ring.

3. The structure set forth in claim 1 in which said spacer comprises a coarse woven wire cloth and in which said contact locations between said spacer and said at least one sheet are disposed adjacent the areas of said spacer where the wires thereof overlap one another.

4. The structure set forth in claim 1 in which said sealing ring is disposed wholly between said sheets.

5. The structure as set forth in claim 1 in which said ring and said spacer are of the same thickness and hold said sheets apart a uniform distance throughout the entire areas thereof.

6. The structure set forth in claim 1 in which said brazing material also joins said sheets to said sealing ring.

7. The structure set forth in claim 1 in which said ring is of a continuous shape and in which the filter leaf is provided with an opening at its center for conducting fluid from the space between said sheets.

8. The structure set forth in claim 1 in which said ring is provided with a gap and an outlet fitting positioned on said filter leaf at said gap to conduct fluid from the space between said sheets and through said gap.

9. The method of manufacturing a filter leaf comprising the steps of distributing a brazing material over a porous metallic spacer, placing the spacer in a brazing furnace between a pair of sheets, at least one of said sheets comprising a fine woven wire mesh, positioning a sealing ring between said sheets in a surrounding relationship to said spacer, said sealing ring being of a thickness substantially equal to the thickness of said spacer, applying a force to the opposite sides of said sheets to hold said sheets in intimate contact with said spacer and subjecting said spacer and sheets to a brazing temperature sufficient to cause said brazing material to flow to the points of contact of said spacer with said sheets and form brazed joints at said points of contact whereby said sheets, spacer and ring are united into a single rigid structure in which movement of any portion of said mesh away from said spacer is prevented.

10. The method set forth in claim 9 in which the brazing material is applied to one side only of the spacer.

11. The method set forth in claim 9 in which brazing material is also applied to at least one side of the sealing ring to braze at least one of said sheets to the sealing ring.

12. The method set forth in claim 9 in which said sheets are secured to said sealing ring prior to the placement of the sheets, sealing ring and spacer in the furnace to maintain the proper relative positioning of said parts during the brazing operation.

* * * * *